March 2, 1954 H. S. ORR 2,670,796
APPARATUS FOR CUTTING STRIP
Filed Jan. 10, 1951 2 Sheets-Sheet 1

Inventor:
HOWARD S. ORR,
by: Donald G. Dalton
his Attorney.

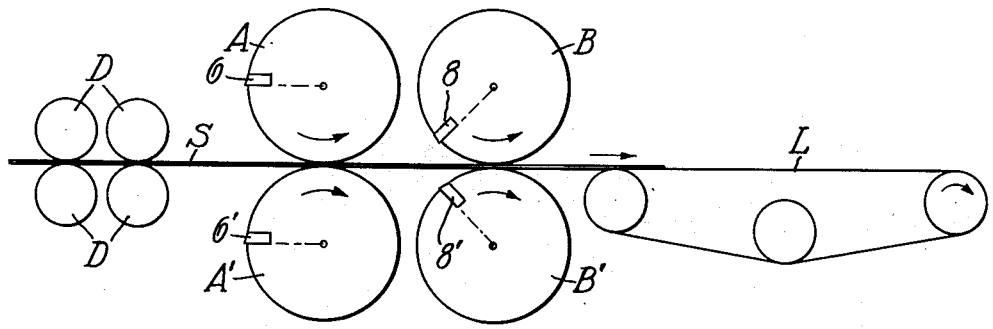
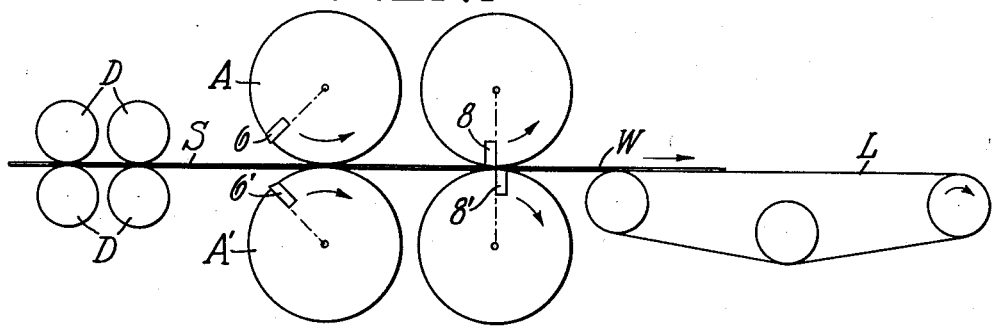
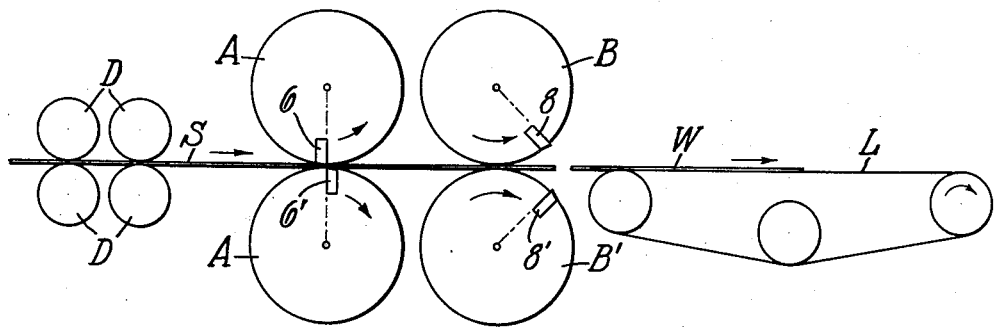
Inventor:
HOWARD S. ORR,
by: Donald G. Dalton
his Attorney.

Patented Mar. 2, 1954

2,670,796

UNITED STATES PATENT OFFICE 2,670,796

APPARATUS FOR CUTTING STRIP

Howard S. Orr, Pittsburgh, Pa., assignor to United States Steel Corporation, a corporation of New Jersey Application January 10, 1951, Serial No. 205,353

3 Claims. (Cl. 164—68)

The present invention relates to apparatus for cutting moving strip of metal transversely to its length, and, more particularly, to apparatus for cutting strip moving at high rates of speed.

Since the high rate of strip travel precludes the use of any cutting means depending on reciprocal action, the steel industry has practically universally adopted drum-type cutters. Drum-type rotary cutters comprise two metallic cylinders placed perpendicularly to the strip travel and located in a vertical plane. A groove is provided in their surface parallel to their axis and a cutting blade is inserted in this groove. These cylinders are mounted so as to permit the blades of two cylinders to come in contact on the completion of each revolution. Strip is led between two drums and is cut in desired lengths when the blades come in contact.

While this arrangement is satisfactory for cutting strip moving at moderate speeds, i. e., about 700 F. P. M., the use of drum cutters presents unsurmountable difficulties at high speeds upwardly of 1000 F. P. M. Since it is desirable for such cutters to rotate at a peripheral speed equal to the velocity of strip travel during the cutting interval, they are commonly operated by elliptic gear trains. Such high peripheral speeds increase the difficulties of maintaining accurate adjustments necessary for shearing uniform lengths and cause excessive wear. Furthermore, the high angular velocities involved develops an excessive torque on all moving parts of the cutter, and this also reduces the possible accuracy of the shearing.

It is accordingly an object of this invention to provide apparatus for cutting fast moving strip accurately.

It is another object to provide apparatus which will cut fast moving strip into a wide variety of sizes.

It is a further object to provide such apparatus which is rugged and durable in design and trouble free in operation.

The foregoing and further objects will be apparent from the following specification when read in conjunction with the attached drawings, wherein:

Figures 3 through 5 are enlarged side views showing schematically the operation of the cutting device of Figures 1 and 2.

Figure 1:
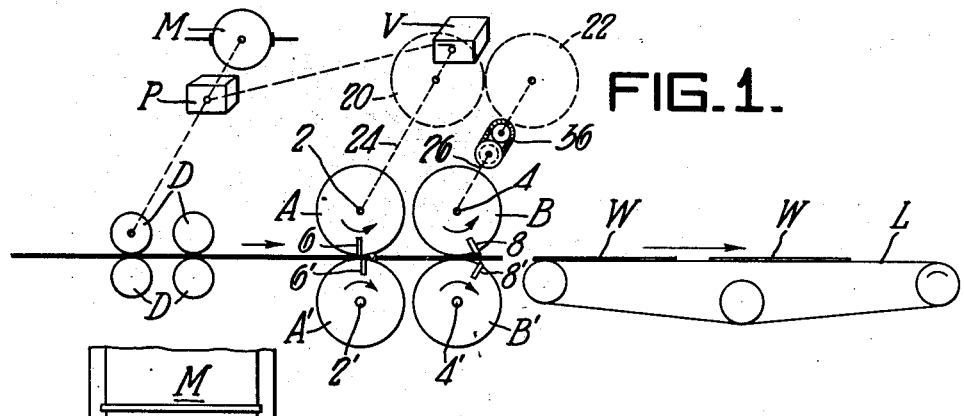
Figure 1 is a schematic view of a strip cutter embodying my invention.
Figure 2:
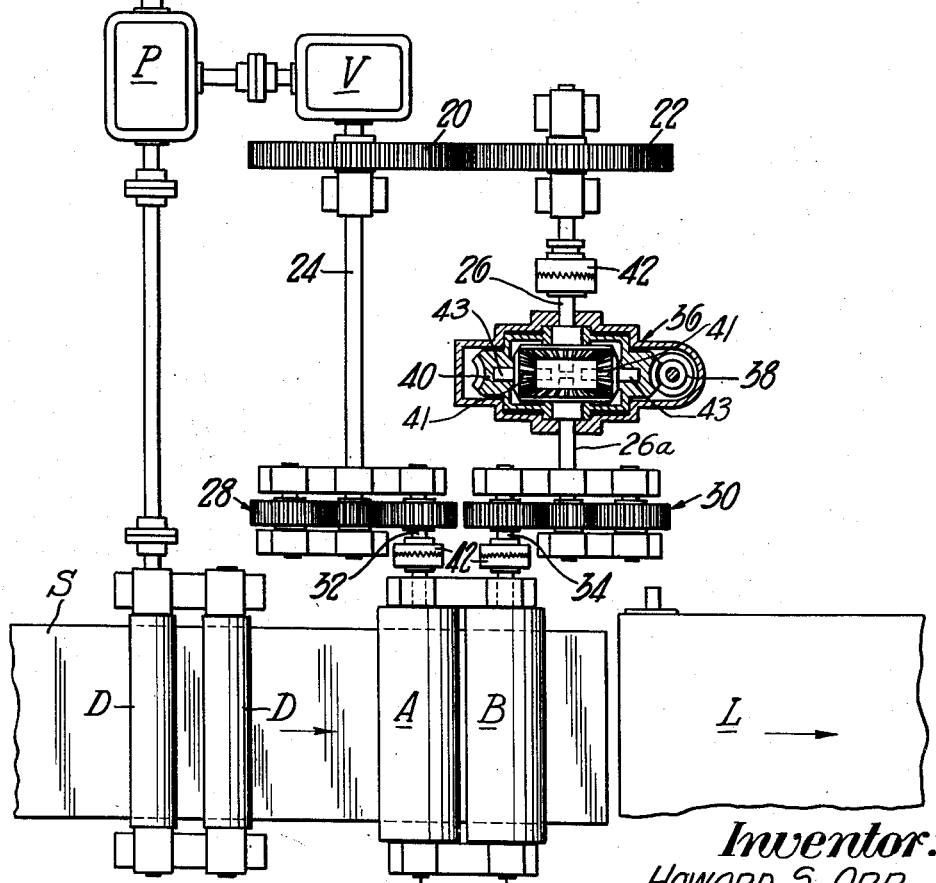
Figure 2 is a plan.

Referring more particularly to the drawings, the general functioning of my improved cutter is shown in Figure 1. This cutter comprises two pairs of rotatable drum cutters A, A' (rearward) and B, B' (forward) on fixed axes 2, 2' and 4, 4' having cutting blades 6, 6' and 8, 8'. The drums are arranged in tandem and are adapted to make successive cuts on strip S fed therethrough by pinch rolls D to shear the same into sheets W of the desired length. The sheets W are carried away from the cutter by a suitable conveyor such as a belt conveyor L to a sheet piler (not shown). Since the drums A, A' and B, B' are not in contact, the strip can be fed therebetween when the cutting blades 6, 6' and 8, 8' are not oppositely disposed.

For the sake of simplicity, the drum gear arrangement will be described for the upper drums A and B only, it being understood that the lower drums are synchronously driven by a duplicate arrangement thereof. Pinch rolls D and drums A and B are driven by a suitable motor M through a suitable gear box P and variable speed transmission V. Gears 20, 22, shafts 24, 26, elliptical gears 28, 30 and shafts 32, 34 are disposed between the variable speed transmission V and drums A and B. A differential gear arrangement 36 is disposed in the shaft 26 permitting fine angular adjustment of drum B during operation of the cutter by rotating worm gear 38. The worm 38 meshes with an annular gear 40 rotatably mounted in the differential and has the small bevel gears 41 of the differential journaled therein at 43. Thus rotation of worm 38 will cause relative rotation between the shafts 26 and 26a on either side of the differential if one offers more resistance to turning than the other. During the operation of the cutter, shaft 26 is driven so that rotation of the worm 38 will rotate shaft 26a and the drum B rather than shaft 26. Suitable disengageable couplings 42 may be disposed in shafts 26, 32 and 34. Thus it is seen that drums A and B are driven at a speed correlated to the pinch rolls D and to the speed of travel of the strip S.

In operation, the strip S is fed to the shear by pinch rolls D and the cutter drums A, A' and B, B' are driven at a corresponding rate of speed. Figures 3 through 5 schematically illustrate the manner of operation of the shear of my invention. As shown, the strip moves from left to right between the two pairs of cutting drums. The strip is cut by the rearmost cutters before the blades of the foremost come together so that at the moment of cutting by the rearmost cutters, the strip is positively located thereagainst by the feed or pinch rolls and likewise against the blades of the foremost cutter when the cutting portion of its cycle comes into operation. In Figure 3, the strip is shown freely moving between the drums and in Figure 4 the blades of the rearmost cutter are severing the strip while the blades of the foremost cutter are still "open." Figure 5 depicts the final phase of the cycle when the forward edge of the strip is passing between the rearmost drums and is being cut by the cutters of the foremost drums.

Before beginning the cutting operation, couplings 42 in shafts 32 and 34 are disengaged and drums A, A' are brought into the position of blade engagement shown in Figure 5 and drums B, B' are rotated until their blades are out of phase with the cutters of drums A, A' a sufficient number of degrees to obtain the desired length of cut. Further fine adjustment during operation is obtained by suitable operation of worm gear 38 which acts through differential 36 to rotate the drum B relative drum A.

In a preferred embodiment to obtain a range of sheets of from 15" to 60" drums of 13.5" in diameter and 42.41" in circumference are used, the drums being spaced 14.5" from center line to center line. With such drums only one drum is used for 30 to 60" lengths, whereas both are used for 15 to 30" lengths. The length of cut when both cutters are in use depends on the amount the rearmost cutter is out of phase with the first, the advance in degrees being designated $\alpha$. This angle for the different lengths of cut may be calculated as follows: L being line speed in ins./min. and C being length of cut in inches.

For any shearing operation:

Length of cut (ins.) $\times$ shaft speed (R. P. M. = strip speed (ins./min.)

Or for this case, $C \times$ R. P. M. $= L$ and, $$\text{Shaft speed} = \frac{L}{C} \text{ R. P. M.}$$

Time interval for one cut, "C" ins. long $= \frac{C}{L}$ min.

Time interval for $(C-$ drum spacing, ins.$) =$
$$\frac{(C-D)}{L} \quad \frac{C}{L}$$

$\alpha =$ Advance in degrees $= \frac{L}{C} \times 360° \times \frac{(C-D)}{L}$ or $$\alpha = 360° \times \frac{C-D}{C}$$

In this case $D = 14.5"$ or $$\alpha = 360° \times \frac{C - 14.5"}{C}$$

This shows that the second shear must be advanced with respect to the first shear a given number of degrees, depending on the length of cut, and is independent of the line speed.

| Length of Cut, Inches | Advance in Degrees | Length of Cut Inches | Advance in Degrees |
|---|---|---|---|
| 14.5 | 0 | 23 | 133.1 |
| 15 | 12.0 | 24 | 142.5 |
| 16 | 33.8 | 25 | 151.5 |
| 17 | 52.9 | 26 | 159.3 |
| 18 | 70.0 | 27 | 166.8 |
| 19 | 85.3 | 28 | 173.6 |
| 20 | 99.0 | 29 | 180.0 |
| 21 | 111.2 | 30 | 186.0 |
| 22 | 122.8 | | |

The use of multiple cutting stations described in this invention leads to many advantages. With two drum cutters arranged in tandem, it it possible to reduce substantially in two the angular speed of drum rotation without in any way limiting the velocity of strip travel. Since the velocity of horizontal travel of cutting blades 28 is a sinusoidal function of peripheral speed of the drums, it becomes possible here to lower angular velocity of rotation to the extent that only at the moment of cutting, the blades travel horizontally with the speed of strip. Slower motion of drums facilitates close adjustment of the dimensions of cut section, and the accuracy is further improved by a smaller torque produced on lower rotation and greatly increased resistance to wear.

While I have shown and described one specific embodiment of my invention, it will be understood that this embodiment is merely for the purpose of illustration and description and that various other forms may be devised within the scope of my invention, as defined in the appended claims.

1. Strip cutting mechanism comprising two pairs of drum cutters arranged in tandem, a driving shaft for each of said pairs, said drums being rotatable on fixed axes of rotation, means for moving strip between said cutters, means for correlating the speed of rotation of said cutters with the speed of travel of said strip, coupling means in said shafts adjusting the cutting phase of said cutters relative to the other and additional means in one of said shafts for finely adjusting the cutting phase of one pair of said cutters relative the other pair during operation thereof.

2. Strip cutting mechanism comprising two pairs of drum-type cutters arranged in tandem, pinch rolls for moving strip between said cutters, a driving shaft for each of said pairs of drums, said drums being rotatable on fixed axes of rotation, common driving means for said shafts, means for correlating the rate of rotation of said pinch rolls with the rate of rotation of said shafts, coupling means in said shafts for adjusting the cutting phase of said cutters relative to the other and additional means in one of said shafts for finely adjusting the cutting phase of one pair of said cutters relative the other pair during operation thereof.

3. Strip cutting mechanism comprising two pairs of drum-type cutters arranged in tandem, pinch rolls for moving strip between said cutters, a driving shaft for each of said pairs of drums, said drums being rotatable on fixed axes, common driving means for said shafts, means for correlating the rate of rotation of said pinch rolls with the rate of rotation of said shafts, coupling means in said shafts for adjusting the cutting phase of said cutters relative to the other and additional means for finely adjusting the cutting phase of said cutters relative the other during operation of said cutters, said means comprising differential means in one of said shafts.

HOWARD S. ORR.

References Cited in the file of this patent

UNITED STATES PATENTS

| Number | Name | Date |
|---|---|---|
| 2,180,202 | Hallden | Nov. 14, 1939 |
| 2,410,555 | Stevens | Nov. 5, 1946 |